United States Patent [19]
Gwinn

[11] Patent Number: 6,129,177
[45] Date of Patent: Oct. 10, 2000

[54] PIVOTING TUNED VIBRATION ABSORBER AND SYSTEM UTILIZING SAME

[75] Inventor: James T. Gwinn, Fairview, Pa.

[73] Assignee: Lord Corporation, Cary, N.C.

[21] Appl. No.: 09/178,003

[22] Filed: Oct. 23, 1998

[51] Int. Cl.[7] .................................................... F16F 7/00
[52] U.S. Cl. .......................... 181/207; 181/209; 188/380
[58] Field of Search .................................. 181/207, 208, 181/209; 188/380, 378, 379; 267/136; 248/584, 559, 610, 62

[56] References Cited

U.S. PATENT DOCUMENTS

| | | |
|---|---|---|
| 2,837,175 | 6/1958 | Schweitzer . |
| 3,288,419 | 11/1966 | Wallerstein, Jr. . |
| 3,322,379 | 5/1967 | Flannelly . |
| 3,388,772 | 6/1968 | Marsh et al. . |
| 3,487,888 | 1/1970 | Adams et al. . |
| 3,490,556 | 1/1970 | Bennett, Jr. et al. . |
| 3,668,939 | 6/1972 | Schrader . |
| 3,767,181 | 10/1973 | Van der Burgt et al. . |
| 3,780,207 | 12/1973 | Crosby et al. . |
| 4,043,432 | 8/1977 | Scheldorf . |
| 4,230,291 | 10/1980 | Marshall, II . |
| 4,311,213 | 1/1982 | Desjardins et al. . |
| 4,381,043 | 4/1983 | Fukushima . |
| 4,456,213 | 6/1984 | Fukushima et al. . |
| 4,575,203 | 3/1986 | Brandt et al. . |
| 4,576,356 | 3/1986 | Kucera ..................................... 188/380 |
| 4,697,781 | 10/1987 | Hamano et al. . |
| 4,716,986 | 1/1988 | Umemoto et al. ...................... 181/207 |
| 4,744,547 | 5/1988 | Härtel . |
| 4,852,848 | 8/1989 | Kucera . |
| 5,052,530 | 10/1991 | Shimazaki . |
| 5,072,801 | 12/1991 | Freymann et al. . |
| 5,118,051 | 6/1992 | Sheehy et al. . |
| 5,193,644 | 3/1993 | Hart et al. . |

OTHER PUBLICATIONS

Tuned Vibration Absorbers, A Quiet Revolution, Lord Corporation, Aerospace Products Division, PB–6004, Aug. 1992.

*Primary Examiner*—Khanh Dang
*Attorney, Agent, or Firm*—James W. Wright; Randall S. Wayland

[57] ABSTRACT

A tuned vibration absorber and vibration-reduced pipeline system utilizing same. The tuned vibration absorber includes a support frame, a tuning mass mounted for pivotal movement relative to the support frame about a pivot; the tuning mass including a lever, and a spring contacting the lever. In the vibration-reduced pipeline system, the absorber's support frame is preferably secured atop of the pipeline section, preferably by at least one strap, to absorb vibrations thereof. In a preferred aspect, the tuning mass includes an arm extending from the pivot in a first direction and a weight repositionably mounted thereon. The lever extends from the arm along a second direction substantially orthogonal to the first direction. Preferably the line of action (along A—A) of the spring extends substantially parallel to the first direction. An adjuster is provided for readjusting a position of the tuning mass relative to said support frame due to drift in the spring. Preferably, the absorber includes pin means, such as a readily removable pin, for quickly disconnecting the spring as well as pin means for limiting deflection of the tuning mass. A cover including first and second portions houses the tuning mass and spring.

32 Claims, 4 Drawing Sheets

PIVOTING TUNED VIBRATION ABSORBER AND SYSTEM UTILIZING SAME

FIELD OF THE INVENTION

This invention relates to the area of vibration control systems, and more particularly, to tuned vibration absorbers for reducing vibration in structures.

BACKGROUND OF THE INVENTION

Tuned absorbers include a tuning mass suspended on a spring member and absorb vibration of the member they are attached to. They are resonant devices and their natural frequencies are generally tuned to coincide with a predominant disturbance frequency of the vibrating member. Examples of tuned absorbers may be found in U.S. Pat. Nos. 3,388,772, 3,490,556, 3,668,939, 4,230,291, 4,697,781, 4,852,848 and 5,052,530. Tuned absorbers including a pivot are found in U.S. Pat. Nos. 3,767,181 and 5,072,801.

Various methods have been used in an attempt to reduce vibration in pipelines. For example, U.S. Pat. No. 5,193,644 to Hart et al. entitled "Pipeline Vibration Absorber," which is hereby incorporated by reference herein, describes a pipeline vibration absorber 22 including a mass 32 interconnected to the pipeline 10 by a damper member 23 which includes an elastomer 34 and spaced apart support parts 36. The assembly 22 is connected to the pipeline section 10 via a clamp assembly 14 including semicircular straps 16 and bolts 18. These systems, although they function adequately, undesirably hang from beneath the pipeline where they are easily tampered with. Moreover, because they hang below the pipeline, their operation may be interfered with by brush growing or snow buildup underneath the pipeline. Therefore, there is a need for a vibration absorber that includes a compact profile.

SUMMARY OF THE INVENTION

In light of the advantages and drawbacks of the prior art, the present invention is a tuned vibration absorber and vibration-reduced pipeline system utilizing same. More particularly, the tuned vibration absorber comprises a support frame, a tuning mass mounted for pivotal movement relative to said support frame about a pivot, the tuning mass including a lever, and a spring in contact with, and preferably mounted to, the lever. In the system for reducing vibrations in pipelines, the absorber's support frame is preferably secured atop of the pipeline section, preferably by at least one strap, to absorb vibrations thereof.

In a preferred aspect, the tuning mass comprises an arm extending from the pivot in a first direction with a weight mounted thereon. Preferably, the arm comprises a channel including a slot formed therein, and the weight can be repositioned along the slot to adjust the natural frequency of the absorber. Preferably also, the lever extends from the arm along a second direction substantially orthogonal to the first direction and the spring includes a line of action which extends substantially parallel to the first direction. Most desirably, the spring comprises a first end pivotally attached to the lever and a second end pivotally attached to the support frame.

According to another aspect of the invention, means for adjusting a position (spacing) of the tuning mass relative to the support frame is provided. Preferably, the means for adjusting includes an adjuster attached at a second end of the spring. This allows the weight to be repositioned if the spring should relax (drift) slightly thereby allowing centering the tuning mass within the sway space.

According to a preferred embodiment, the spring comprises elastomer which is preferably loaded in pure tension along a line of action thereof. More preferably, the elastomer exhibits a shape factor of between about 0.05 and 0.5.

According to a further aspect, the absorber includes pin means, such as at least one readily removable pin, for quickly disconnecting the spring from the support frame and/or lever and also allowing pivoting between the spring and the frame and tuning mass. Pin means may also be provided for limiting rotational deflection of the tuning mass.

According to a further aspect, the absorber comprises a cover. The cover may include first and second portions which form a cavity and wherein the tuning mass and spring are entirely housed within the cavity.

According to a further aspect, the tuning mass comprises an arm extending from the pivot in a first direction, the arm includes a weight mounted thereon a first distance (R1) from the pivot, the lever extending from the pivot in a second direction substantially perpendicular to the first direction, the spring attaching to the lever at a second distance from the pivot, the second distance being less than the first distance.

According to another aspect of the invention is provided a vibration reduced pipeline system comprising a pipeline section supported between support points, a tuned vibration absorber, further comprising a support frame, means for securing said support frame to said pipeline section, a tuning mass mounted for pivotal movement relative to said support frame about a pivot, and a spring mounted to said tuning mass. Preferably, the tuning mass includes an arm supporting a weight; the arm extending from the pivot in a first direction, and a lever extending from the pivot in a second direction substantially perpendicular to the first direction, and the spring being mounted to the lever. Most preferably, the spring includes a line of action which extends substantially parallel to the first direction thereby providing a device which exhibits a compact height. Preferably, the tuned vibration absorber is mounted atop the pipeline section and includes a cover.

It is an advantage of one aspect of the present invention that the tuned absorber is compact in height.

It is another advantage of the present invention that its resonant frequency may be easily adjusted.

It is another advantage of the present invention that the position of the tuned mass may be adjusted.

It is another advantage of the present invention that it includes means for adjusting for stress relaxation in the spring.

It is another advantage of the present invention that the spring may be readily changed out.

It is another advantage of the present invention that the components of the absorber are included within a cover where they cannot be easily tampered with and where they are weatherproofed.

It is another advantage of the present invention that it may be mounted atop the pipeline where it operates away from debris, such a bush and snowdrifts underneath the pipeline and away from where people or animals may cone into contact with the absorber.

The above-mentioned and further aspects, advantages and characteristics of the present invention will become apparent from the accompanying description of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE PREFERRED EMBODIMENT

Figure 1:
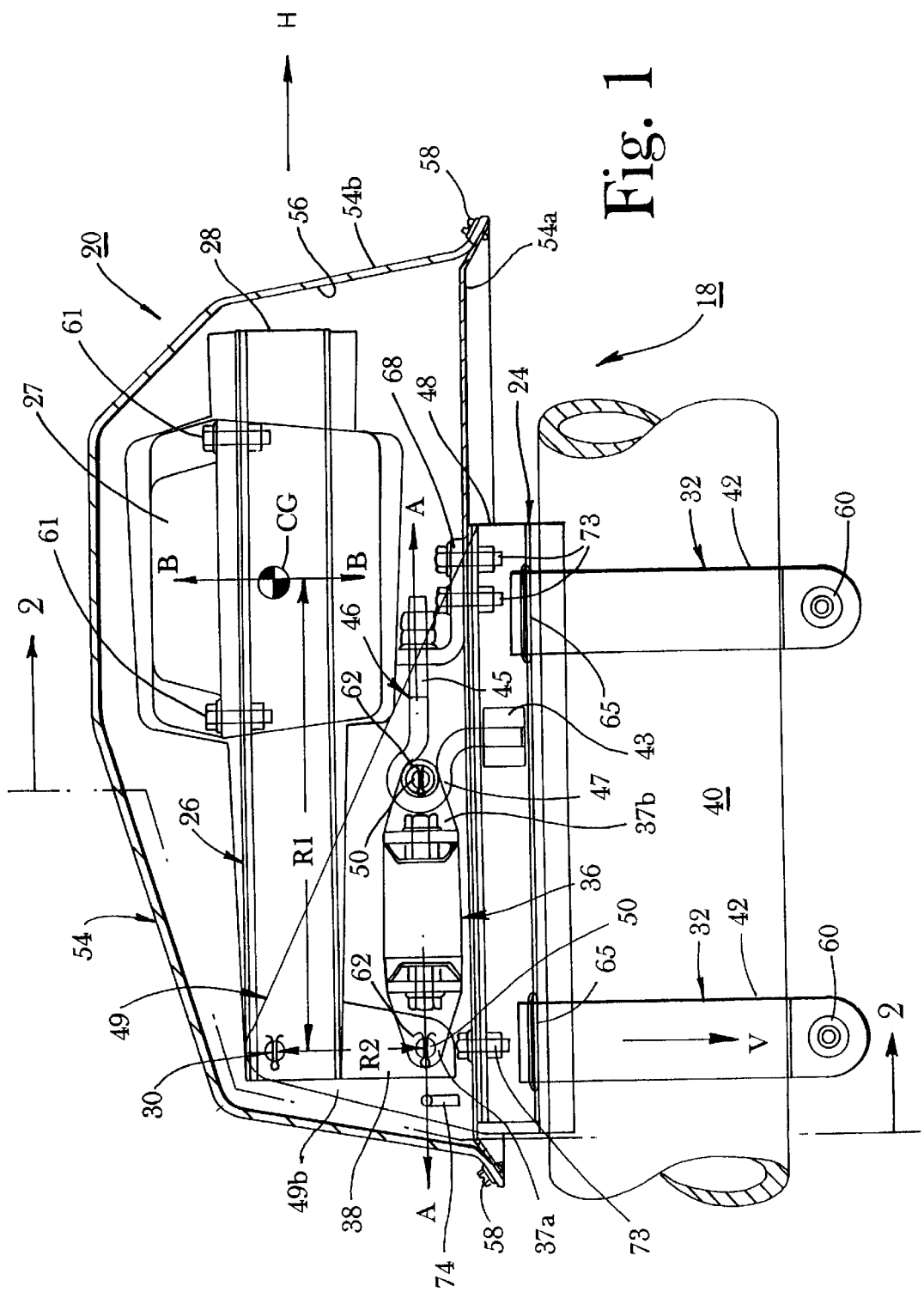
FIG. 1 illustrates a partial cross-sectioned side view of an embodiment of the tuned vibration absorber in accordance with the present invention.

Referring now to the drawings where like numerals denote like elements, in FIG. 1 through FIG. 4, shown generally at 20, is an embodiment of the present invention tuned vibration absorber. The absorber 20 includes a support frame 24, a tuning mass 26 mounted for pivotal movement relative to the support frame 24, the tuning mass including a lever 38, and a spring 36 mounted to the lever 38.

The support frame 24 preferably comprises a rigid channel 48 mounted to a bracket 49 by welding, gluing, bolting or other suitable means for securing. The bracket 49 includes a base portion 51 which contacts the pipeline section 10 and projecting sides 49a, 49b extending therefrom. The sides 49a, 49b includes through holes 63 which receive a pivot pin 64 which is received through like holes in the arm 28 to define the pivot 30.

Straps 42 are secured in lateral slots 65 formed in the bracket projecting sides 49a, 49b. The means for securing the frame 24 to the pipe 10 comprises at least one strap 42, and more preferably two strap assemblies 32 each including first and second straps 42 received in the slots 65 at one end and secured together by fastener 60 at the other.

In a vibration reduced pipeline system 18 including the absorber 20 according to the invention, the support frame 24 is secured to a pipeline section 40 to absorb vertical vibrations thereof. Preferably, the support frame 24 is secured to the pipeline 40 by at least one, and more preferably a plurality of strap assemblies 32 including at least one strap 42. The tuning mass 26 comprises an arm 28 extending from the pivot 30 in a first direction H, a weight 27 mounted on the arm, and the lever 38.

The arm 28 comprises a channel including a slot 44 formed therein. Slot nuts 67 are slidably received in the slot 44 and together with bolts 61 secure the weight 27 to the arm 28. The weight 27 is repositionable along the slot 44 by loosening bolts 61 slightly and sliding the weight inboard or outboard on the arm 28 to adjust the absorber natural frequency. Preferably, the lever extends from the arm along a second direction V substantially orthogonal to the first direction H. The weight 27 may be formed of cast iron or stacks of stamped metal blanks. Alternatively, the arm and weight could be cast or formed as an integral unit. The lever 38 is welded to the arm adjacent to the pivot 30 and extends from the pivot in a second direction V. The spring attaches to the lever at a distance R2 away from the pivot in the V direction.

In the preferred embodiment, the spring 36 includes a line of action A—A which extends substantially parallel to the first direction H. The spring preferably includes a first end 37a pivotally attached to the lever 38 and a second end 37b pivotally attached to the support frame 24. The pivotal attachment is provided by pins 50 received through the ends of spring 36. Preferably, the absorber 20 also includes means for vertically adjusting the position of the tuning mass 26 relative to the support frame 24. This allows the weight to be repositioned vertically to a centered position between the cover 54 and the frame 24 thereby accommodating the event of spring drift due to stress relaxation. A preferred adjuster 46 is attached at a second end 37b of the spring 36. The adjuster 46 includes an eye portion 47 connected to a threaded shaft 45 and to a slider 43. Threading nuts onto shaft 45 moves the position of eye along the H direction relative to a tab integral with the frame 24 and thereby repositions the tuning mass 26 (including lever, arm and weight) relative to the frame 24. The slider 43 is received in a slot formed in channel 48 and prevents rotation of the eye 47.

The spring 36 preferably comprises elastomer 39 which is preferably loaded in pure tension along the line of action A—A. The elastomer 39 preferably exhibits a low shape factor of between about 0.05 and 0.5; the shape factor being defined as the ratio of load area to bulge area. Alternatively, other types of springs, such as helical coil springs, Belleville springs, leaf spring, molded rubber ring spring, molded rubber springs or elastomer shear springs may be used.

Figure 2:
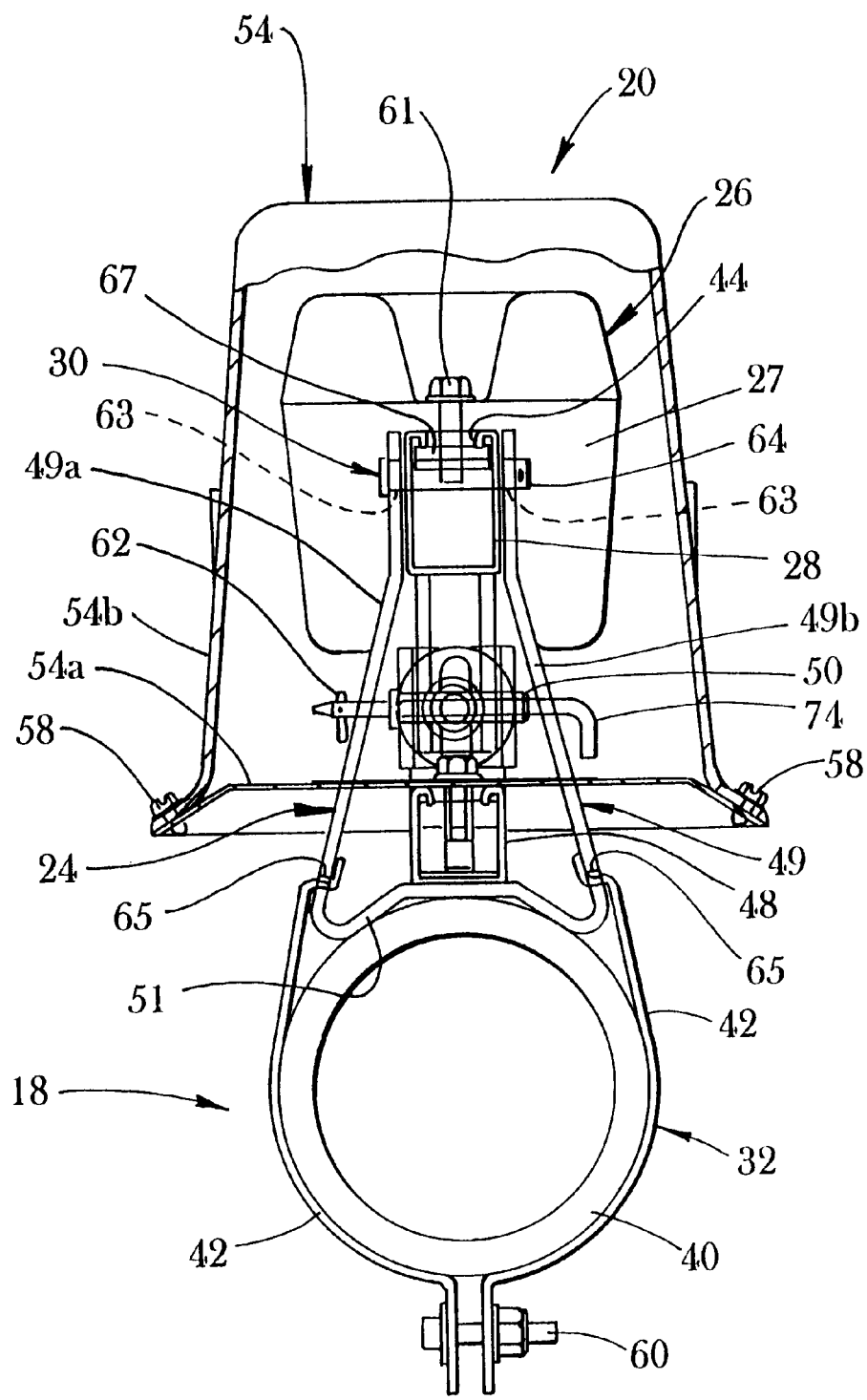
FIG. 2 illustrates a partial cross-sectioned end view of the embodiment of FIG. 1 along line 2—2 of FIG. 1.
Figure 3:
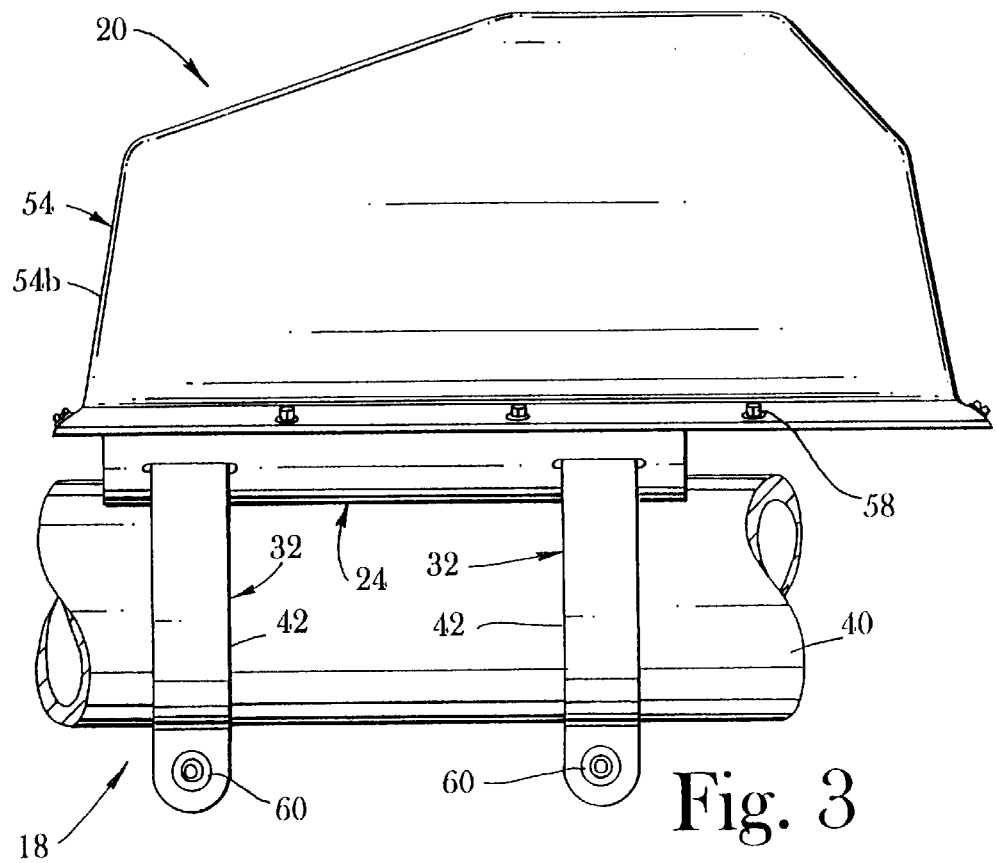
FIG. 3 illustrates a side view of the tuned vibration absorber of FIG. 1.
Figure 4:
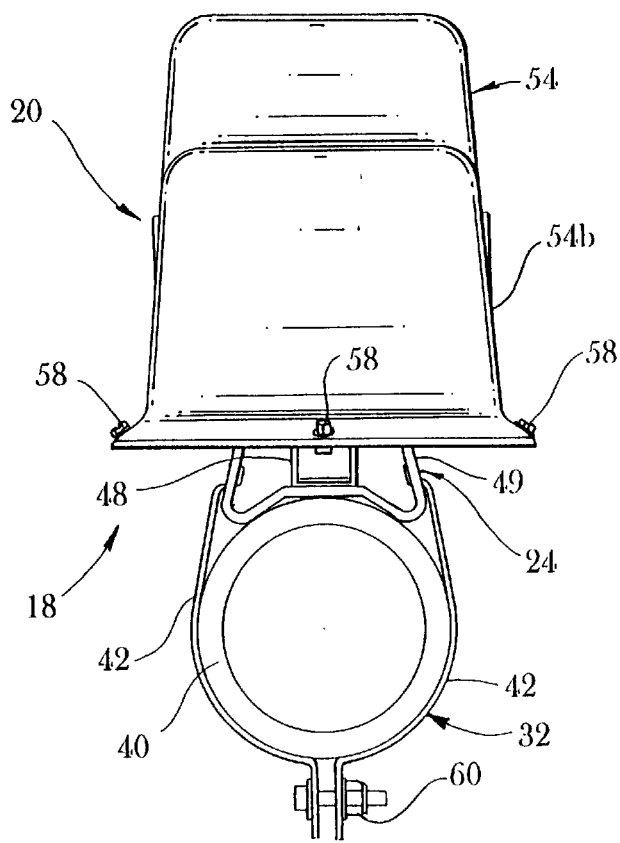
FIG. 4 illustrates an end view of the tuned vibration absorber of FIG. 1, and FIGS. 5a and 5b illustrate the spring element of the tuned absorber of FIG. 1.
Figure 5A:
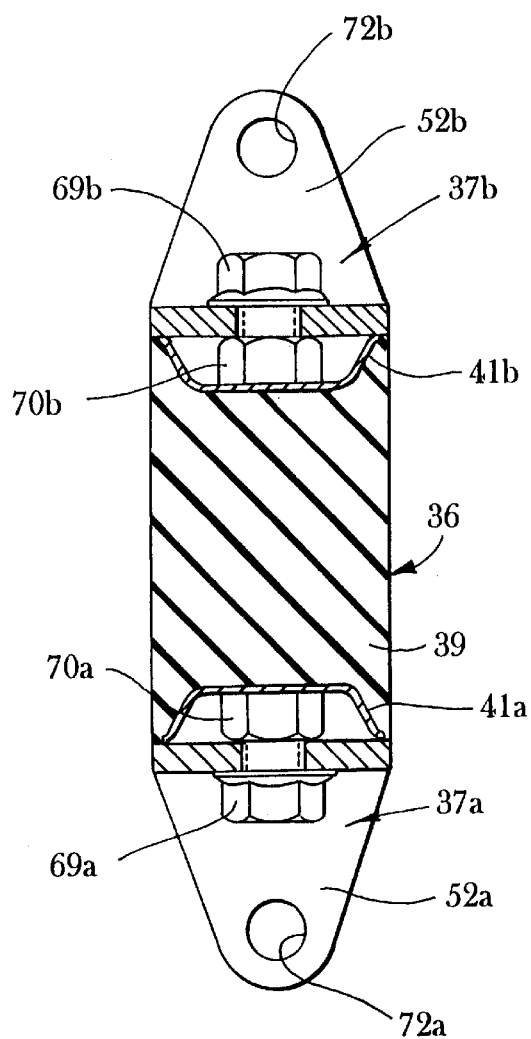
Figure 5B:
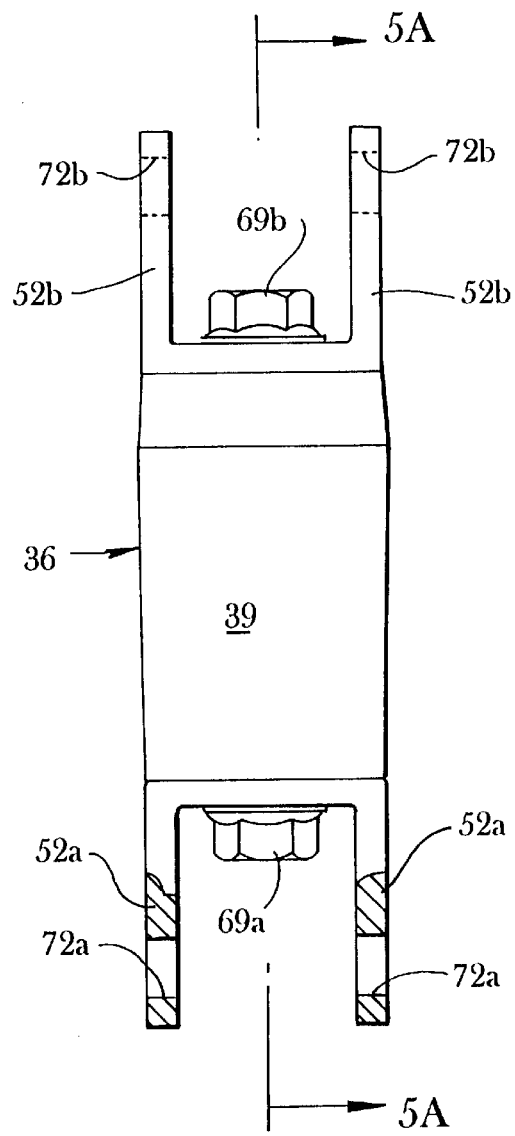

As best shown in FIG. 5, the elastomer 39 of spring 36 is bonded to a first plate 41a located at a first end 37a of the spring 36 and to a second plate 41b located at a second end 37b of the spring 36 via conventional bonding means such as injection or transfer bonding. Clevises 52a, 52b are mounted to the respective plates 41a, 41b by threading bolts 69a, 69b into nuts 70a, 70b secured to plates 41a, 41b or by other suitable means. Holes 72a, 72b formed in devises 52a, 52b receive pins 50 (FIGS. 1, 2).

The absorber 20 may also includes pin means for quickly disconnecting the spring 36 from the support frame 24 and lever 38. Preferably, the pin means comprises at least one readily removable pin 50. A scaffold pin 74 provides the means for limiting pivotal motion of the tuning mass by contacting the lever 38 when the downward sway envelope is exceeded. The scaffold pin is received through the projecting sides 49a, 49b near the lever 38.

The absorber 20 preferably comprises a plastic or stamped steel cover 54 which protects the internal components from exposure to sun, rain, snow, ice, etc. The cover includes first 54a and second 54b portions which cooperate to form a cavity 56. The tuning mass 26 and spring 36 are entirely housed within the cavity 56. The first portion 54a is clamped to the channel 48 by tab 68 and fasteners 73. Preferably, the portions 54a, 54b are secured together by screws to connect the edges of portions 54a, 54b and form cavity 56.

Preferably, the tuning mass 26 further comprises an arm 28 extending from the pivot 30 in a first direction H; the arm 28 including a weight 27 mounted thereto a first distance (R1) from the pivot 30. The lever 38 preferably extends from the pivot 30 in a second direction V substantially perpendicular to the first direction H. The spring 36 attaches to the lever 38 at a second distance R2 from the pivot 30; the second distance R2 being less than the first distance R1.

In operation, wind induced vertical vibrations of the pipeline 10 cause the tuned mass 26 to oscillate about the pivot 30. This vibrates the weight 27 generally vertically along direction B—B which further loads or unloads the spring 36. The spring 36 and mass 26 are chosen such that the natural frequency fn of the absorber 20 is substantially coincident with the frequency fd of vibration of the pipeline section. Most preferably, the natural frequency fn is set slightly below the disturbance frequency fd. Adjustments to the mass and spring may be rapidly made in the field by readjusting the position of the weight on arm 28 by loosening bolts and sliding weight in or out along arm and then resecuring it. Moving the weight 27 outboard on the arm 28 lowers the natural frequency and conversely, inboard on the arm raises it. Further adjustments in natural frequency may be made by adjusting the stiffness of spring 36 by change out to a spring manufactured from a different modulus material or of a different shape factor. The spring 36 is replaced by removing the cotter keys 62 and removing the pins 50. By way of example and not to be considered limiting, the spring 36 is comprised of a natural rubber elastomer, a synthetic elastomer or a blend of natural and synthetic which is formulated for low temperature spring characteristics. The stiffness of the spring along the axial axis is between about 100 lbs./in. and 1,000 lbs./in. and more preferably about 250 lbs./in. By way of example, the weight would weigh between about 10 lbs. To 100 lbs. Channel 48 and arm 28 are manufactured from standard steel channel. Straps 42 and bracket 49 are preferably made from stamped steel.

In summary, it should be apparent from the foregoing that the present invention comprises a novel tuned vibration absorber and vibration reduced pipeline system. The tuned vibration absorber includes a support frame, a tuning mass mounted for pivotal movement relative to the support frame about a pivot, the tuning mass including a lever, and a spring in contact with the lever. The tuning mass preferably includes an arm extending in a first direction from the pivot with a weight mounted thereon and the lever extending from the pivot in a second direction. The line of action of the spring is preferably parallel to the first direction thereby producing a compact device.

The foregoing is illustrative of the present invention and is not to be construed as limiting thereof. Although several exemplary embodiments of this invention have been described, those skilled in the art will readily appreciate that many modifications are possible without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A tuned vibration absorber, comprising:
   (a) a support frame;
   (b) a tuning mass mounted for pivotal movement relative to said support frame about a pivot, said tuning mass including a lever;
   (c) a spring contacting said lever; and
   (d) a cover including first and second portions which form a cavity, said tuning mass and said spring entirely housed within said cavity.

2. A system including the absorber (20) of claim 1 wherein said support frame is secured to a pipeline section to absorb vibrations thereof.

3. A system of claim 2 wherein said support frame is secured to said pipeline section by at least one strap.

4. An absorber (20) of claim 1 wherein said tuning mass comprises an arm extending from said pivot in a first direction and a weight mounted thereon.

5. An absorber (20) of claim 4 wherein said arm comprises a channel including a slot formed therein, said weight being repositionable along said slot.

6. An absorber (20) of claim 4 wherein said lever extends from said arm along a second direction substantially perpendicular to said first direction.

7. An absorber (20) of claim 4 wherein said spring includes a line of action which extends substantially parallel to said first direction.

8. An absorber (20) of claim 7 wherein said spring comprises a first end pivotally attached to said lever and a second end pivotally attached to said support frame.

9. An absorber (20) of claim 1 further including means for adjusting a position of said tuning mass relative to said support frame.

10. An absorber (20) of claim 9 wherein said means includes an adjustable member attached at a second end of said spring.

11. An absorber of claim 1 wherein said support frame comprises a channel mounted to a bracket, said bracket including projecting sides which define said pivot.

12. An absorber of claim 11 wherein straps are secured to said bracket.

13. An absorber (20) of claim 1 wherein said spring comprises elastomer.

14. An absorber (20) of claim 1 wherein said absorber includes pin means for quickly disconnecting said spring from said support frame and lever.

15. An absorber (20) of claim 1 wherein said absorber includes pin means for limiting a deflection of said tuning mass.

16. A tuned vibration absorber, comprising:
   (a) a support frame;
   (b) a tuning mass mounted for pivotal movement relative to said support frame about a pivot, said tuning mass including a lever;
   (c) a spring contacting said lever; and
   wherein said spring comprises an elastomer bonded to a first plate located at a first end of said spring and to a second plate located at a second end of said spring.

17. An absorber (20) of claim 16 further comprising clevis members mounted to said plates.

18. An absorber of claim 16 wherein said elastomer is loaded in pure tension along a line of action of said spring.

19. An absorber of claim 16 wherein said elastomer exhibits a shape factor of between about 0.05 and 0.5.

20. A tuned vibration absorber, comprising:
   (a) a support frame;
   (b) a tuning mass mounted for pivotal movement relative to said support frame about a pivot, said tuning mass including a lever;
   (c) a spring contacting said lever; and
   wherein said tuning mass further comprises an arm extending from said pivot in a first direction, said arm including a weight mounted thereon a first distance from said pivot, said lever extending from said pivot in a second direction substantially perpendicular to said first direction, said spring attaching to said lever at a second distance from said pivot, said second distance being less than said first distance.

21. A tuned vibration absorber (20), comprising:
   (a) a support frame,
   (b) a tuning mass mounted for movement relative to said support frame about a pivot, said tuning mass including:
      i) an arm extending in a first direction from said pivot,
      ii) a lever extending in a second direction from said pivot substantially perpendicular to said first direction, and
      iii) a weight mounted on said arm, and
   (c) a spring contacting said lever.

22. A tuned vibration absorber (20), comprising:
(a) a support frame,
(b) a tuning mass mounted for pivotal movement relative to said support frame about a pivot, said tuning mass including:
   i) an arm extending in a first direction from said pivot,
   ii) a lever extending in a second direction from said pivot substantially perpendicular to said first direction, and
   iii) a weight mounted to said arm, and
(c) a spring mounted to said lever, said spring including a line of action along said first direction.

23. A tuned vibration absorber (20), comprising:
(a) a support frame including projecting sides having a pivot formed therein,
(b) a tuning mass mounted for pivotal movement relative to said support frame about a pivot, said tuning mass including:
   i) an arm extending in a first direction from said pivot,
   ii) a lever extending in a second direction from said pivot substantially perpendicular to said first direction, and
   iii) a weight mounted to said arm, and
(c) a spring mounted to said lever, said spring including a line of action along said first direction.

24. A vibration-reduced pipeline system, said system comprising:
(a) a pipeline section,
(b) a tuned vibration absorber, including:
   (i) a support frame,
   (ii) means for securing said support frame to said pipeline section,
   (ii) a tuning mass mounted for pivotal movement relative to said support frame about a pivot, and
   (iii) a spring contacting said tuning mass.

25. A system of claim 24 wherein said tuning mass includes an arm supporting a weight, said arm extending from said pivot in a first direction, and a lever extending from said pivot in a second direction substantially perpendicular to said first direction, said spring being mounted to said lever.

26. A system of claim 25 wherein said spring includes a line of action which extends substantially parallel to said first direction.

27. A system of claim 24 wherein said spring comprises an elastomer loaded in pure tension along a line of action of said spring.

28. A system of claim 24 wherein said absorber is mounted atop said pipeline section.

29. A system of claim 24 wherein said absorber includes a cover.

30. A system of claim 24 wherein said absorber includes means for adjusting a position of said tuning mass relative to said support frame.

31. An absorber (20) of claim 24 wherein said absorber includes pin means for quickly disconnecting said spring from said support frame and tuning mass.

32. An absorber (20) of claim 24 wherein said absorber includes pin means for limiting a deflection of said tuning mass.

* * * * *